(12) United States Patent
Van Beek et al.

(10) Patent No.: US 7,647,340 B2
(45) Date of Patent: Jan. 12, 2010

(54) METADATA IN JPEG 2000 FILE FORMAT (75) Inventors: Petrus Van Beek, Vancouver, WA (US); Muhammed Ibrahim Sezan, Camas, WA (US); George R. Borden, IV, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1187 days.

(21) Appl. No.: 09/882,416

(22) Filed: Jun. 15, 2001

(65) Prior Publication Data

US 2002/0091665 A1 Jul. 11, 2002

Related U.S. Application Data (60) Provisional application No. 60/214,878, filed on Jun. 28, 2000.

(51) Int. Cl.
*G06F 17/30* (2006.01)
(52) U.S. Cl. .................. 707/104.1; 707/100; 707/101; 382/180; 382/231
(58) Field of Classification Search .............. 707/102, 707/200, 100, 101; 715/513, 514, 529, 512; 382/190, 232, 243, 305
See application file for complete search history.

(56) References Cited

U.S. PATENT DOCUMENTS

| 4,321,635 | A | 3/1982 | Tsuyuguchi |
| 4,324,402 | A | 4/1982 | Klose |
| 4,719,509 | A | 1/1988 | Sakamoto |
| 5,012,334 | A | 4/1991 | Etra |
| 5,019,903 | A | 5/1991 | Dougall et al. |
| 5,095,354 | A | 3/1992 | Sokawa et al. |
| 5,226,114 | A | 7/1993 | Martinez et al. |
| 5,233,421 | A | 8/1993 | Chrisopher |
| 5,288,069 | A | 2/1994 | Matsumoto |
| 5,307,164 | A | 4/1994 | Dong-Il |
| D348,251 | S | 6/1994 | Hendricks |
| 5,327,529 | A | 7/1994 | Fults et al. |
| 5,329,314 | A | 7/1994 | Correa et al. |
| D354,059 | S | 1/1995 | Hendricks |
| 5,404,316 | A | 4/1995 | Klingler et al. |
| 5,410,326 | A | 4/1995 | Goldstein |

(Continued)

FOREIGN PATENT DOCUMENTS

EP 0596823 5/1994

(Continued)

OTHER PUBLICATIONS

MPEG Requirement Group, "MPEG7 Context and Objectives", Doc. ISO/IEC JTC1/SC29/WG11 N2082, MPEG San Jose Meeting, Feb. 1998.*

(Continued)

*Primary Examiner*—Khanh B Pham
(74) *Attorney, Agent, or Firm*—Chernoff, Vilhauer, McClung & Stenzel (57) ABSTRACT

A JPEG2000 file includes a plurality of boxes containing data suitable to render an image including a metadata box that includes information within the box describing the content of the image. The information within the metadata box describing content may be MPEG-7 data, which is compliant with the MPEG-7 specification.

48 Claims, 7 Drawing Sheets

U.S. PATENT DOCUMENTS

| | | | |
|---|---|---|---|
| 5,428,397 A | 6/1995 | Lee et al. | |
| 5,430,490 A | 7/1995 | Rim | |
| 5,434,678 A | 7/1995 | Abecassis | |
| 5,444,499 A | 8/1995 | Saitoh | |
| 5,475,438 A | 12/1995 | Bretl | |
| 5,483,278 A | 1/1996 | Strubbe et al. | |
| 5,493,338 A | 2/1996 | Hong | |
| D368,263 S | 3/1996 | Hendricks | |
| 5,517,247 A | 5/1996 | Correa et al. | |
| 5,519,451 A | 5/1996 | Clatanoff et al. | |
| 5,532,751 A | 7/1996 | Lui | |
| 5,539,471 A | 7/1996 | Myhrvold et al. | |
| 5,539,871 A | 7/1996 | Gibson | |
| 5,541,662 A | 7/1996 | Adams et al. | |
| 5,550,592 A | 8/1996 | Markandey et al. | |
| 5,550,965 A | 8/1996 | Gabbe et al. | |
| 5,553,221 A | 9/1996 | Reimer et al. | |
| 5,559,549 A | 9/1996 | Hendricks et al. | |
| 5,559,949 A | 9/1996 | Reimer et al. | |
| 5,586,235 A | 12/1996 | Kauffman | |
| 5,589,945 A | 12/1996 | Abecassis | |
| 5,594,504 A | 1/1997 | Ebrahimi | |
| 5,596,705 A | 1/1997 | Reimer et al. | |
| 5,600,364 A | 2/1997 | Hendricks et al. | |
| 5,600,573 A | 2/1997 | Hendricks et al. | |
| 5,600,775 A | 2/1997 | King et al. | |
| 5,600,781 A | 2/1997 | Root et al. | |
| 5,602,654 A | 2/1997 | Patti et al. | |
| 5,610,653 A | 3/1997 | Abecassis | |
| 5,611,036 A | 3/1997 | Berend et al. | |
| 5,634,849 A | 6/1997 | Abecassis | |
| D381,991 S | 8/1997 | Hendricks | |
| 5,655,117 A | 8/1997 | Goldberg et al. | |
| 5,659,350 A | 8/1997 | Hendricks et al. | |
| 5,664,046 A | 9/1997 | Abecassis | |
| 5,682,195 A | 10/1997 | Hendricks et al. | |
| 5,684,918 A | 11/1997 | Abecassis | |
| 5,696,869 A | 12/1997 | Abecassis | |
| 5,696,965 A | 12/1997 | Dedrick | |
| 5,706,049 A | 1/1998 | Moghadam et al. | |
| 5,708,845 A | 1/1998 | Wistendahl et al. | |
| 5,710,884 A | 1/1998 | Dedrick | |
| 5,717,814 A | 2/1998 | Abecassis | |
| 5,724,472 A | 3/1998 | Abecassis | |
| 5,727,129 A | 3/1998 | Barrett et al. | |
| 5,727,141 A | 3/1998 | Hoddie et al. | |
| 5,734,853 A | 3/1998 | Hendricks et al. | |
| 5,754,710 A | 5/1998 | Sekine et al. | |
| 5,758,259 A | 5/1998 | Lawler | |
| 5,761,881 A | 6/1998 | Wall | |
| 5,774,357 A | 6/1998 | Hoffberg et al. | |
| 5,794,210 A | 8/1998 | Goldhaber et al. | |
| 5,797,001 A | 8/1998 | Augenbraun et al. | |
| 5,798,785 A | 8/1998 | Hendricks et al. | |
| 5,818,441 A | 10/1998 | Throckmorton et al. | |
| 5,822,537 A | 10/1998 | Katseff et al. | |
| 5,832,495 A | 11/1998 | Gustman | |
| 5,835,087 A | 11/1998 | Herz et al. | |
| 5,838,385 A | 11/1998 | Reder et al. | |
| D402,310 S | 12/1998 | Hendricks | |
| 5,848,396 A | 12/1998 | Gerace | |
| 5,861,881 A | 1/1999 | Freeman et al. | |
| 5,862,260 A | 1/1999 | Rhoads | |
| 5,867,226 A | 2/1999 | Wehmeyer et al. | |
| 5,867,386 A | 2/1999 | Hoffberg et al. | |
| 5,875,108 A | 2/1999 | Hoffberg et al. | |
| 5,878,222 A | 3/1999 | Harrison | |
| 5,886,745 A | 3/1999 | Muraji et al. | |
| 5,892,536 A | 4/1999 | Logan et al. | |
| 5,900,867 A | 5/1999 | Schindler et al. | |
| 5,901,246 A | 5/1999 | Hoffberg et al. | |
| 5,903,454 A | 5/1999 | Hoffberg et al. | |
| 5,913,013 A | 6/1999 | Abecassis | |
| 5,920,477 A | 7/1999 | Hoffberg et al. | |
| 5,926,624 A | 7/1999 | Katz et al. | |
| 5,929,849 A | 7/1999 | Kikinis | |
| 5,929,918 A | 7/1999 | Marques Pereira et al. | |
| 5,930,783 A | 7/1999 | Li et al. | |
| 5,936,676 A | 8/1999 | Ledinh et al. | |
| 5,945,988 A | 8/1999 | Williams et al. | |
| 5,946,419 A | 8/1999 | Chen et al. | |
| 5,956,026 A | 9/1999 | Ratakonda | |
| 5,958,006 A | 9/1999 | Eggleston et al. | |
| 5,970,179 A | 10/1999 | Ito | |
| 5,973,683 A | 10/1999 | Cragun et al. | |
| 5,977,964 A | 11/1999 | Williams et al. | |
| 5,986,690 A | 11/1999 | Hendricks | |
| 5,986,692 A | 11/1999 | Logan et al. | |
| 5,987,211 A | 11/1999 | Abecassis | |
| 5,990,927 A | 11/1999 | Hendricks et al. | |
| 5,995,094 A | 11/1999 | Eggen et al. | |
| 6,002,833 A | 12/1999 | Abecassis | |
| 6,006,265 A | 12/1999 | Rangan et al. | |
| 6,011,895 A | 1/2000 | Abecassis | |
| 6,029,195 A | 2/2000 | Herz | |
| 6,038,367 A | 3/2000 | Abecassis | |
| 6,040,868 A | 3/2000 | Jun | |
| 6,049,821 A | 4/2000 | Theriault et al. | |
| 6,052,554 A | 4/2000 | Hendricks et al. | |
| 6,064,385 A | 5/2000 | Sturgeon et al. | |
| 6,067,401 A | 5/2000 | Abecassis | |
| 6,070,167 A | 5/2000 | Qian et al. | |
| 6,072,934 A | 6/2000 | Abecassis | |
| 6,081,750 A | 6/2000 | Hoffberg et al. | |
| 6,088,455 A | 7/2000 | Logan et al. | |
| 6,088,722 A | 7/2000 | Herz et al. | |
| 6,091,886 A | 7/2000 | Abecassis | |
| RE36,801 E | 8/2000 | Logan et al. | |
| 6,115,709 A | 9/2000 | Gilmour et al. | |
| 6,133,909 A | 10/2000 | Schein et al. | |
| 6,151,444 A | 11/2000 | Abecassis | |
| D435,561 S | 12/2000 | Pettigrew et al. | |
| 6,160,989 A | 12/2000 | Hendricks et al. | |
| 6,181,335 B1 | 1/2001 | Hendricks et al. | |
| 6,185,625 B1 | 2/2001 | Tso et al. | |
| 6,198,767 B1 | 3/2001 | Greenfield et al. | |
| 6,201,536 B1 | 3/2001 | Hendricks et al. | |
| 6,208,805 B1 | 3/2001 | Abecassis | |
| 6,215,526 B1 | 4/2001 | Barton et al. | |
| 6,223,183 B1 * | 4/2001 | Smith et al. | 707/102 |
| 6,230,501 B1 | 5/2001 | Bailey, Sr. et al. | |
| 6,233,389 B1 | 5/2001 | Barton et al. | |
| 6,236,395 B1 | 5/2001 | Sezan et al. | |
| 6,252,544 B1 | 6/2001 | Hoffberg | |
| 6,256,785 B1 | 7/2001 | Klappert et al. | |
| 6,269,216 B1 | 7/2001 | Abecassis | |
| 6,289,165 B1 | 9/2001 | Abecassis | |
| 6,298,482 B1 | 10/2001 | Seidman et al. | |
| 6,304,715 B1 | 10/2001 | Abecassis | |
| 6,317,718 B1 | 11/2001 | Fano | |
| 6,324,694 B1 | 11/2001 | Watts et al. | |
| 6,370,504 B1 | 4/2002 | Zick et al. | |
| 6,393,578 B1 * | 5/2002 | Swidler et al. | 713/600 |
| 6,412,008 B1 | 6/2002 | Fields et al. | |
| 6,426,761 B1 | 7/2002 | Kanevsky et al. | |
| 6,426,974 B2 | 7/2002 | Takahashi et al. | |
| 6,463,445 B1 * | 10/2002 | Suzuki et al. | 707/200 |
| 6,487,390 B1 | 11/2002 | Virine et al. | |
| 6,522,342 B1 | 2/2003 | Gagnon et al. | |
| 6,543,053 B1 | 4/2003 | Li et al. | |
| 6,546,555 B1 | 4/2003 | Hjelsvold et al. | |
| 6,553,178 B2 | 4/2003 | Abecassis | |
| 6,578,075 B1 | 6/2003 | Nieminen et al. | |
| 6,593,936 B1 | 7/2003 | Huang et al. | |

| | | | |
|---|---|---|---|
| 6,594,699 B1 | 7/2003 | Sahai et al. | |
| 6,611,876 B1 | 8/2003 | Barrett et al. | |
| 6,678,659 B1 | 1/2004 | Van Kommer | |
| 7,143,434 B1* | 11/2006 | Paek et al. | 725/142 |
| 2002/0003844 A1* | 3/2002 | Levy et al. | 345/44 |
| 2002/0133412 A1 | 9/2002 | Oliver et al. | |

FOREIGN PATENT DOCUMENTS

| | | |
|---|---|---|
| EP | 0790736 | 8/1997 |
| JP | 080125957 | 5/1996 |
| JP | 09322154 | 12/1997 |
| JP | 11032267 | 2/1999 |
| JP | 11261908 | 9/1999 |
| JP | 2000013755 | 1/2000 |
| JP | 2001036861 | 2/2001 |
| JP | 2002503896 | 2/2002 |
| WO | WO 9741690 | 11/1997 |
| WO | WO 9816062 | 4/1998 |
| WO | WO 9904143 | 1/1999 |
| WO | WO 9912194 | 3/1999 |
| WO | WO 9965237 | 12/1999 |

OTHER PUBLICATIONS

Pereira Fernando, "MPEG-7: a Standard for Describing Audiovisual Information", IEEE colloquium on Multimedia Databases and MPEG-7, Jan. 29, 1999, pp. 6/1-6/6.*
Paek et al., "Self-Describing Schemes for Interoperable MPEG-7 Multimedia Content Descriptions", Symposium on Electronic Imaging: Visual Communications and Image Processing, IST/SPIE'99, San Jose, CA, Jan. 1999, pp. 1-13.*
MPEG-7 Multimedia Description Schemes, Experimentation Model (XM) v 3.0, N 3410, Geneva, May 2000.
MPEG-7 Multimedia Description Schemes, Working Draft (WD) v 3.0, N 3411, Geneva, May 2000.
MPEG-7 Multimedia Description Schemes, Description Definition Language (DDL) V 3.0, N 3391, Geneva, May 2000.
MPEG-7 Multimedia Description Schemes, Visual Part of XM v. 6.0, N 3398, Geneva, May 2000.
MPEG-7 Multimedia Description Schemes, Visual Part, Working Draft (WD) v. 3.0, N 3399, Geneva, May 2000.
ISO/IEC JTC1/WG11 MxxxX mpeg 99, Oct. 1999, Melbourne, Australia; pp. 1-17.
ISO/IEC JTC1/WG11 N2844; MPEG 99, Jul. 1999,Vancouver; pp. 1-42.
Ibrahim Sezan, et al., "A Proposal for User Preference Descriptions in MPEG-7," ISO/IEC JTC1 SC29/WG11 M5222, MPEG 99 Oct. 4, 1999, Sharp Labs of America and LG Corporate Institute of Research.
Composite Capability/Preference Profiles (CC/PP): A user side framework for content negotiation, W3C Note, Jul. 27, 1999, (http://www.w3.org/1999/07/NOTE-CCPP-19990727/).
"Customer Profile Exchange (CPExchange) Specification," Kathy Bohrer and Bobby Holland, editors, Oct. 20, 2000, Version 1.0.
"Description Schemes for Consumer Video Applications," ISO/IEC JTC1/SC29/WG11—MPEG-7 Proposal, Feb. 1999.
Annex F of ITU-T Recommendation T.84, ISO/IEC IS 10918-3, "Digital compression and coding of Continuous-Tone Still Images—Extensions."
JPEG File Interchange Format, pp. 510-515.
"MPEG-7 Description Definition Language Document V2," ISO/IEC JTC1/SC29/WG11 Coding of Moving Pictures and Audio, N2997, Oct. 1999/Melbourne.
"MPEG-7 Description Schemes (V0.5)," ISO/IEC JTC1/SC29/WG11, Coding of Moving Pictures and Audio Information, N2844, MPEG 99, Jul. 1999, Vancouver.
"MPEG-7 Generic AV Description Schemes (V0.7)," ISO/IEC JTC1/SC29/WG11, Coding of Moving Pictures and Audio Information, N2966, MPEG 99, Oct. 1999, Melbourne.
"MPEG-7 Media/Meta DSs upgrade (V0.2)," ISO/IEC JTC1/SC29/WG11, Coding of Moving Pictures and Audio Information, MXXXX, MPEG 99, Oct. 1999 Melbourne.
"MPEG-7 Requirements," ISO/IEC JTC1/SC29/WG11, Coding of Moving Pictures and Audio, MPEG99/4601, Mar. 1999.
"MPEG-7 Requirements Document V.9," ISO/IEC JTC1/SC29/WG11/N2859, Jul. 1999/ Vancouver (Canada).
"Proposal of Usage History DS," ISO/IEC JTC1/SC29/WG11, Coding of Moving Pictures and Associated Audio, MPEG00/M6259, Jul. 2000, Beijing.
"Specification of The UsageHistory DS," ISO/IEC JTC 1/SC 29/WG 11, Coding of Moving Pictures and Audio, M5748, Mar. 2000, Noordwijkerhout.
Still Picture Interchange File Format, JPG, SPF,pp. 822-837, ISO/IEC (International Standards Organization/International Electrotechnical Commission).
Ted Lewis, "UbiNet: The Ubiquitous Internet Will Be Wireless," DaimlerChrysler Research & Technology, p. 128, 126-127.
"User Preference Descriptions for MPEG-7," ISO/IEC JTC1/SC29/WG11 Coding of Moving Pictures and Audio Information, MPEG 99/MXXXX, Maui, Hawaii, Dec. 1999.
"XML Schema Part 1: Structures," W3C Working Draft, May 6, 1999, (http://www.w3.org/1999/05/06-xmlschema-1/), (in XML and HTML, with accompanying schema and DTD).

* cited by examiner

JPEG 2000 Signature
File Type
Compound Image Header
Data Reference (optional)
Metadata (optional)
Page Collection
    Label (optional)
    Metadata (optional)
    Page Label
    Page Table
Page
    Page Header
    Resolution Box
    Base Color (optional)
    Metadata (optional)
    Layout Object
        Layout Object Header
        Metadata (optional)
        Object Box
            Object Header
            JP2 Header (or Cross-Reference)
                Image Header (or Cross-reference)
                BitsPerComponent (or Cross-reference)
                Color Specification (or Cross-reference)
                Palette (or Cross-reference) (optional)
                Resolution Box
        Object Box
            Object Header
            JP2 Header (or Cross-Reference)
                Image Header (or Cross-reference)
                BitsPerComponent (or Cross-reference)
                Color Specification (or Cross-reference)
                Palette (or Cross-reference) (optional)
                Resolution Box
    Layout Object
    ...
    Layout Object
Fragment Table
Fragment List
Fragment
Fragment
Page
Frag Table
Page
Fragment
Fragment
Metadata (optional)

| Box name | Type | Required? | Comments |
|---|---|---|---|
| JPEG 2000 Signature | 'JP\040\040' (0x6A50 2020) | Yes | This box uniquely defines the file as being part of the JPEG 2000 family of files. |
| File Type | 'ftyp' (0x6674 7970) | Yes | This box specifies file type, version and compatibility information, including specifying if this file is a conforming JPM file. |
| Compound Image Header | 'mhdr' (0x6D68 6472) | Yes | This box contains general information about the compound image file, such as profile and version. |
| Data Reference | 'dtbl' (0x6474 626C) | No | This box contains a set of pointers to other files or data streams not contained within the JPM file itself. |
| Page Collection | 'pcol' | No | This box groups together the locations of a set of pages so that they are treated as related and associated with each other. |
| Label | 'lbl\040' (0x6C62 6C20) | No | This box specifies a textual label for either a Page Box. |
| Page Label | 'pagl' | No | This box associated a label with each page in a page collection. |
| Page Table | 'pagt' (0x7061 6774) | Yes* | This box gives the locations of the pages in a page collection and enables random access of pages in a file. |
| Page | 'page' (0x7061 6765) | Yes | This box contains all the image data and information needed to image a page. |

FIG. 3A

| Box name | Type | Required? | Comments |
|---|---|---|---|
| Page Header | 'phdr' | Yes | This box describes the properties of a page and gives the number of layout objects in the page. |
| Resolution | 'res\040' (0x7265 7320) | Yes | This box specifies the resolution of a page grid or image. |
| Base Color | 'bcol' | No | This box specifies the color of a page or of an object for which no image data is available. |
| Layout Object | 'lobj' (0x6C6F 626A) | Yes | This box contains the information and image data needed to composite a mask-image object pair. |
| Layout Object Header | 'lhdr' | Yes | This box describes the properties of the layout object and assigns each a unique identifier within the file. |
| Object | 'objc' | Yes | This box contains all the image data and information for one object in a layout object. |
| Object Header | 'ohdr' | Yes | This box describes the properties of an object, identifying it as a Mask or an Image object, and assigns each object a unique identifier within the file. |
| JP2 Header | 'jp2h' (0x6A70 3268) | No | This box contains a series of boxes that contain header-type information about a file containing a single image. |
| Image Header | 'ihdr' (0x7061 6765) | Yes | This box specifies the size of the image and other related fields. |

FIG. 3B

| Box name | Type | Required? | Comments |
|---|---|---|---|
| Bits Per Component | 'bpcc' (0x6270 6363) | No | This box specifies the bit depths of the components of an image when the bit depth is not the same for all components. |
| Color Specification | 'colr' (0x636F 6C72) | Yes | This box specifies the colorspace of an image. |
| Palette Box | 'pclr' (0x7063 6C72) | No | This box specifies the palette which maps a single component in index space to a multi-component image in color space. |
| Default Display Resolution | 'resd' (0x7265 7364) | Yes | This box specifies the default grid resolution at which the page or image should be displayed. |
| Fragment Table | 'ftbl' (0x6674 626C) | Yes | This box describes how a codestream has been split up or fragmented and then stored within the file. |
| Fragment List | 'flst' (0x666C 626C) | Yes | This box specifies a list of fragments that make up one particular codestream within the file. |
| Fragment | 'frag' | Yes | This box contains a single fragment of codestream and the identifier of the object which uses it. |
| Cross-reference | 'cref' (0x6372 6566) | No | This box serves specifies that a box found in another location (either within the JPM file or within another file) should be considered as if it was directly contained at this location in the JPM file. |

FIG. 3C

| Box name | Type | Required? | Comments |
|---|---|---|---|
| Media Data | 'mdat' (0x6D64 6174) | Yes | This box contains generic media data, which is referenced through the Fragment box. |
| Free | 'free' (0x6672 6565) | No | This box contains data that is no longer used and may be overwritten when the file is updated. |
| Stream Identifier | 'stid' (0x7063 6C72) | Yes | This box identifies the fragment number (in the sequence of fragments that make up the codestream) and the object which uses the fragment. |

METADATA IN JPEG 2000 FILE FORMAT

CROSS-REFERENCE TO RELATED APPLICATIONS

This application claims the benefit of U.S. Provisional Application No. 60/214,878, filed Jun. 28, 2000.

BACKGROUND OF THE INVENTION

The present invention relates to embedding data in a JPEG2000 file format.

At the core of the JPEG2000 structure is a wavelet based compression methodology that provides for a number of benefits over the previous Discrete Cosine Transformation (DCT) compression methods used in the existing JPEG format. Essentially, wavelets are mathematical expressions that encode the image in a continuous stream; thereby avoiding the tendency toward visible artifacts that can sometimes result from DCT's division of an image into discrete compression blocks.

JPEG2000 wavelet technology can provide as much as a 20% improvement in compression efficiency over existing JPEG DCT compression methods. JPEG2000 wavelet technology also provides for both lossy and lossless compression, as opposed to the lossy technique used in the original JPEG, which can lead to image degradation at high compression levels. In addition, because the JPEG2000 format includes much richer content than existing JPEG files, the bottom line effect is the ability to deliver a Flashpix-level of information in a compressed image file that is 20% smaller than baseline JPEG and roughly 40% smaller than an equivalent Flashpix file.

Another inherent benefit of JPEG2000's use of wavelet technology is the ability to progressively access the encoded image in a smooth continuous fashion without having to download, decode, and/or print the entire file. In a way this allows for a virtual file system within the image file that can be flexibly arranged by the image providers to best suit the way that their users will need to access the information. For instance a "progressive-by-resolution" structure would allow the image information to stream to the user by starting with a low-resolution version and then progressively adding higher resolution as required. On the other hand, a "progressive-by-quality" structure might begin with a full resolution version but with minimal color data per pixel and then progressively add more bits per pixel as required.

Figure 1:
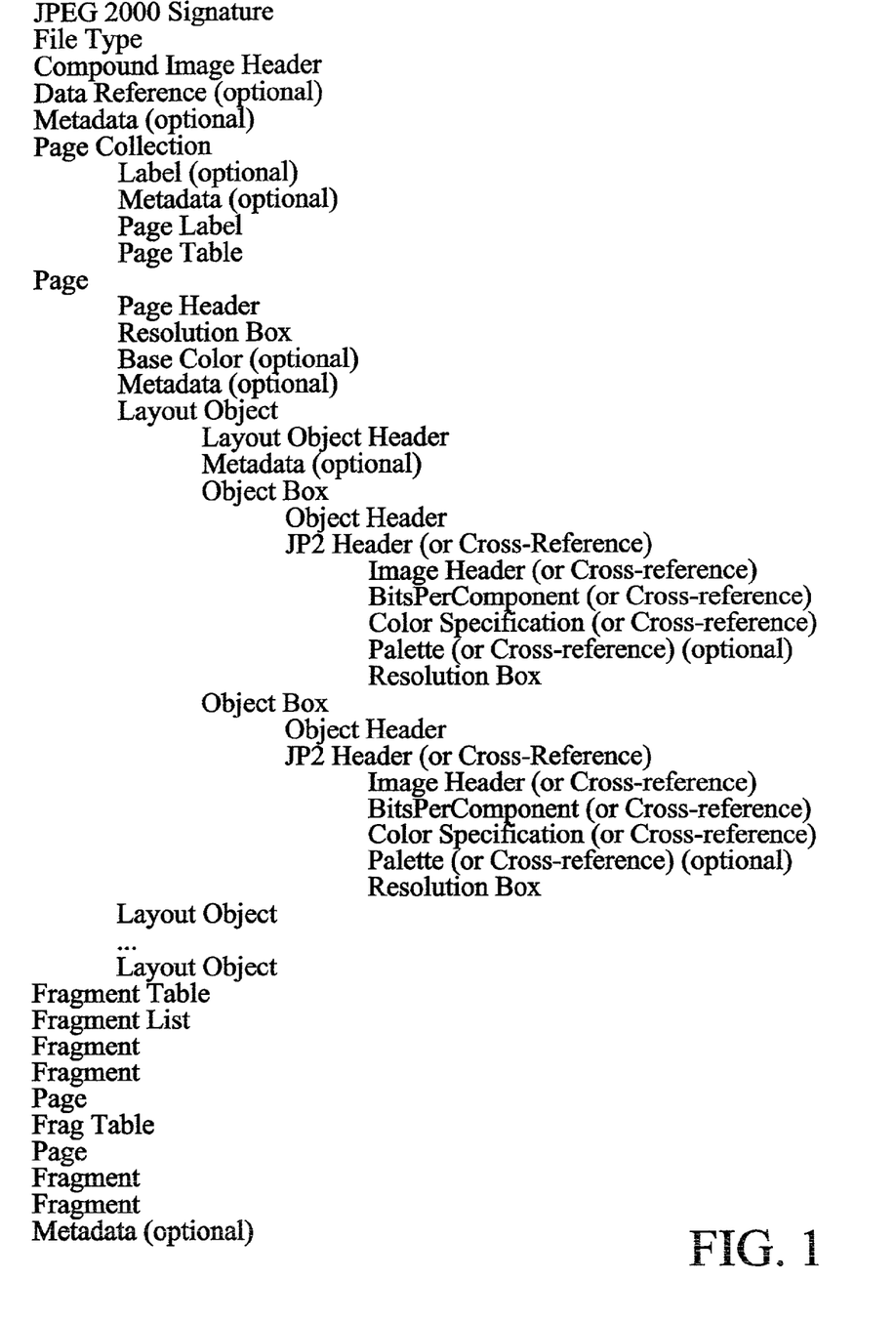
FIG. 1 illustrates JPEG2000 file elements and structure.
Figure 2:
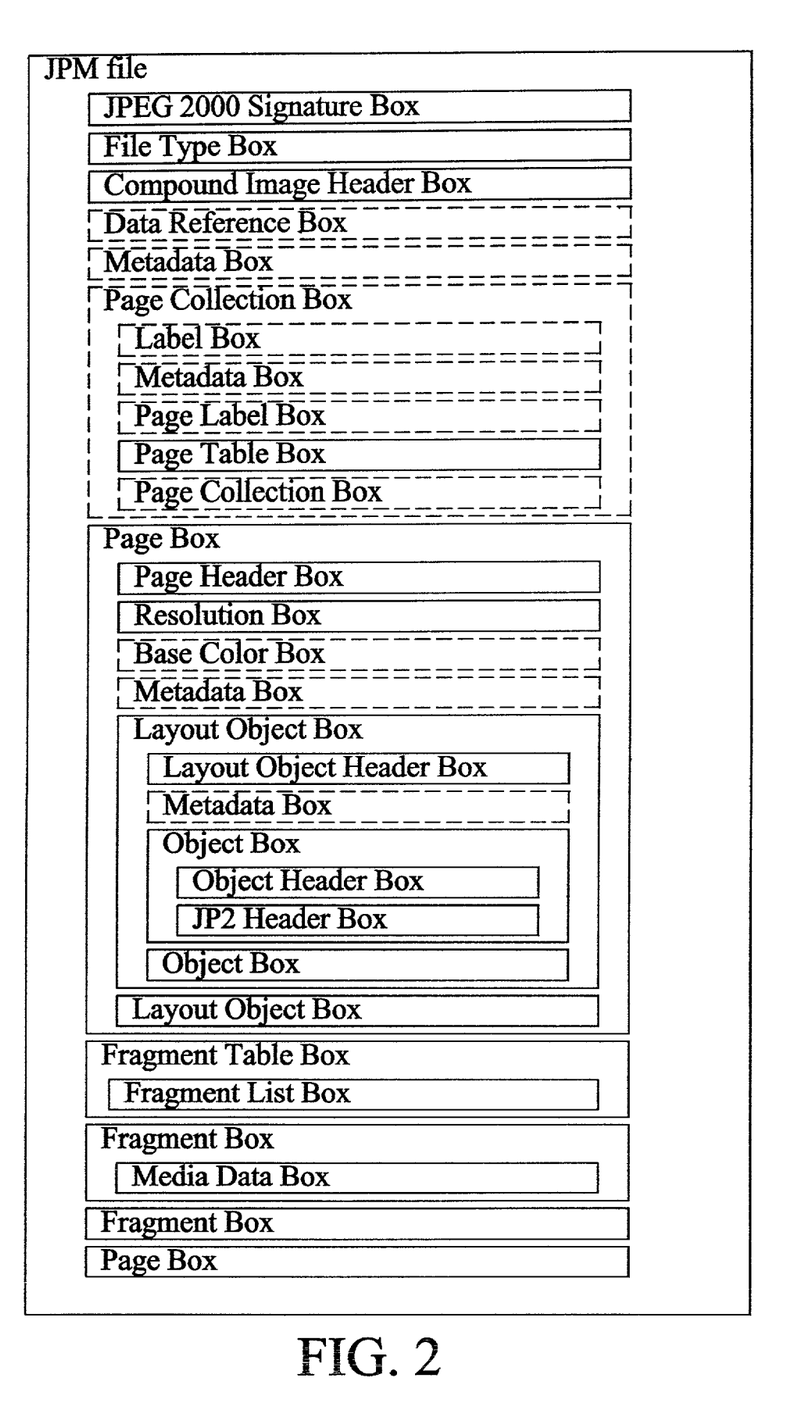
FIG. 2 illustrates conceptual structure of a JPEG2000 file.
Figure 3A:
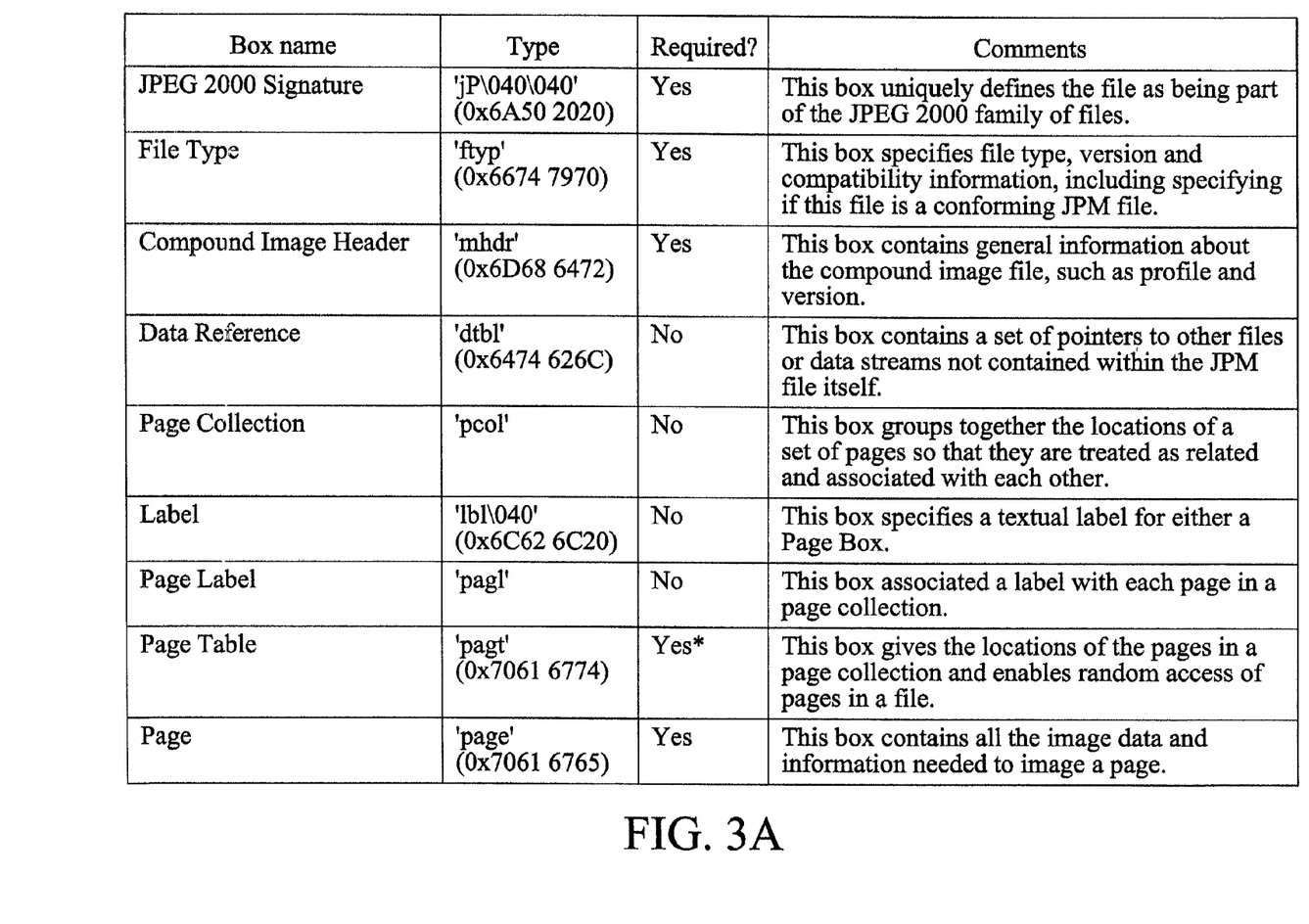
FIGS. 3A-3D describe boxes used in a JPEG2000 file.
Figure 3B:
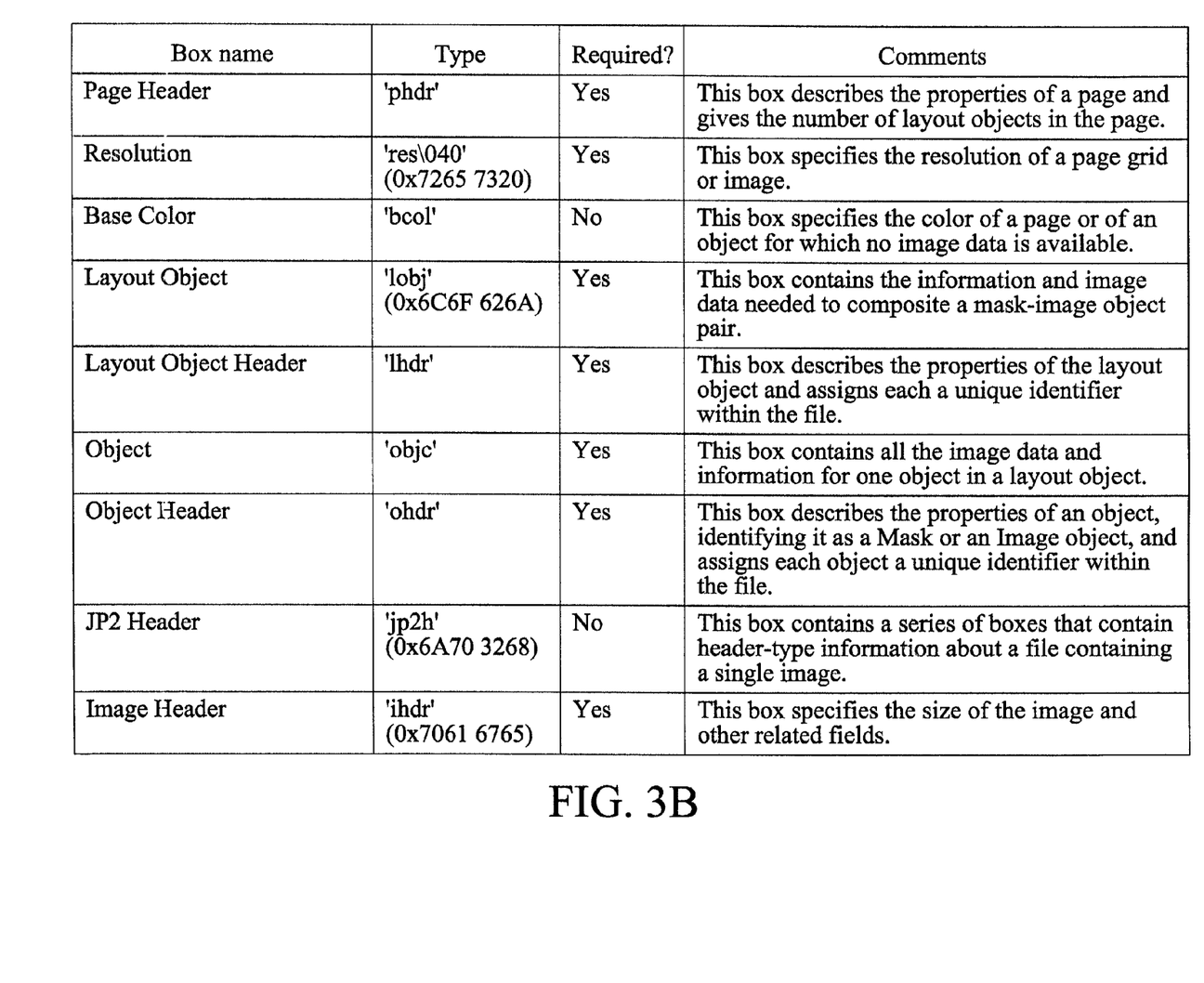
Figure 3C:
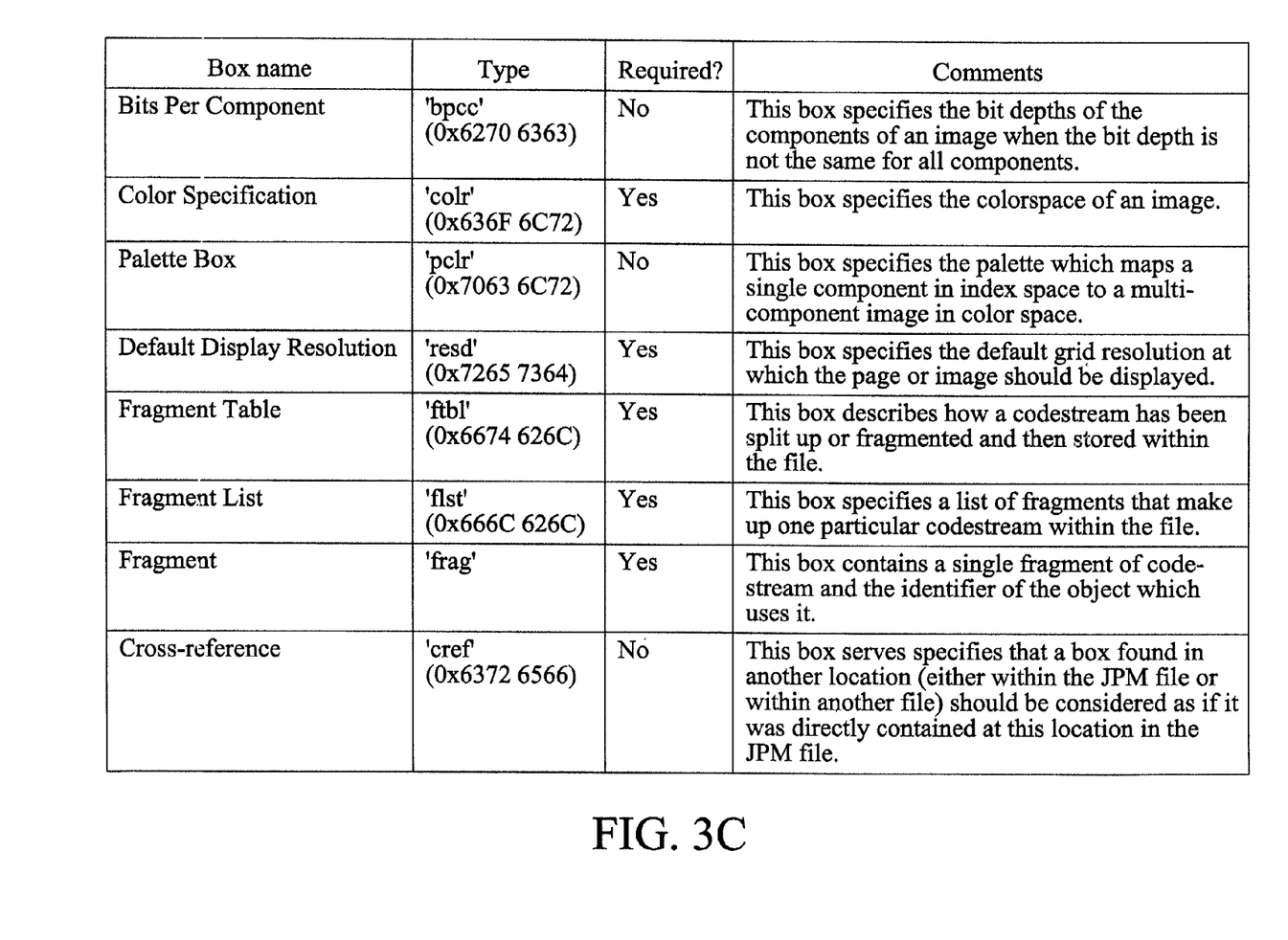
Figure 3D:
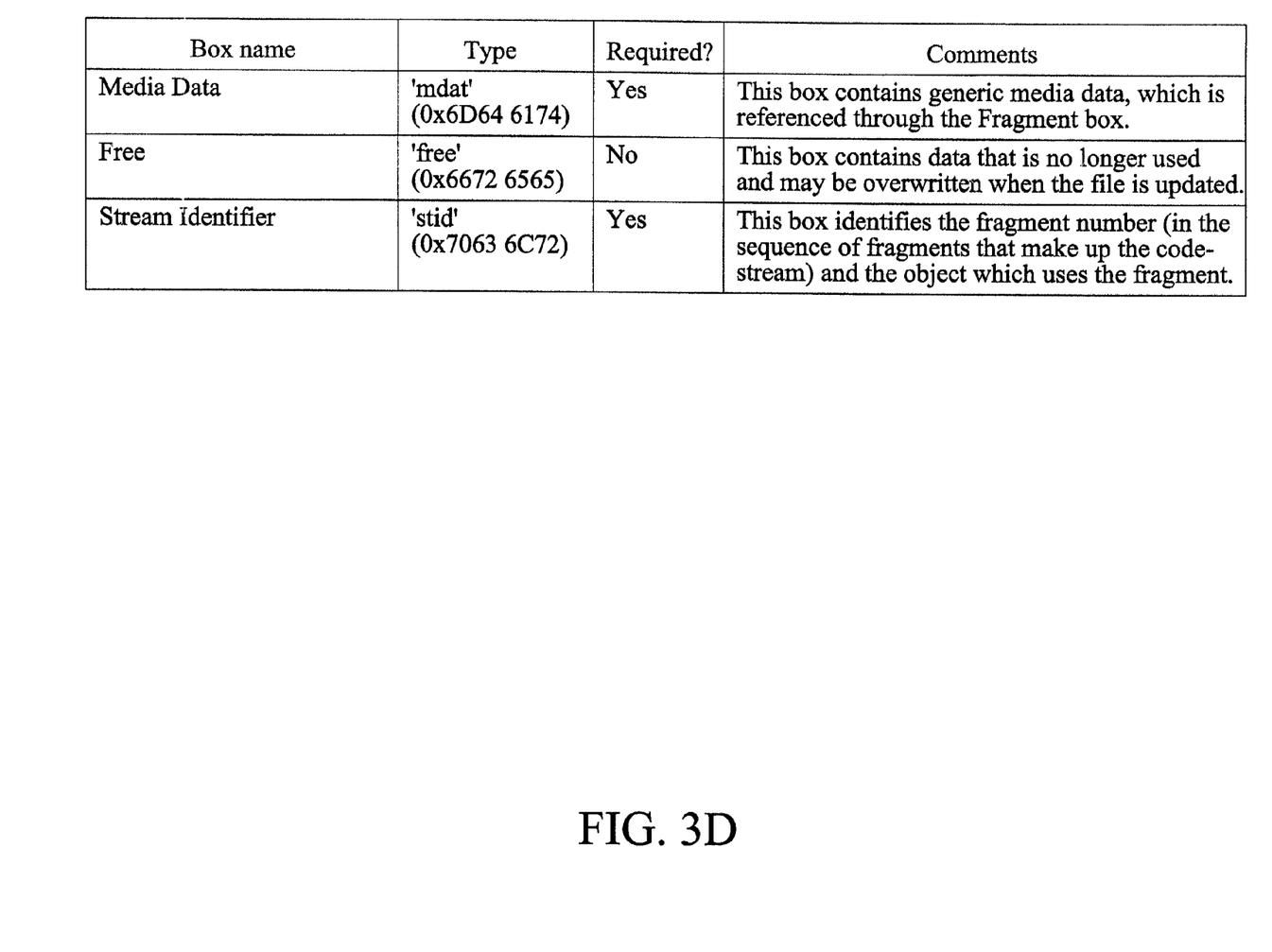

Referring to FIG. 1, a conforming file for the JPEG2000 standard is typically described as a sequence of boxes, some of which contain other boxes. An actual file need not contain all of the boxes shown in FIG. 1, may contain different counts of the boxes, and/or could use the boxes in different positions in the file. A more complete description of the contents of these boxes is discussed in JPEG2000 Image Coding System: Compound Image File Format, JPEG2000 Part VI committee Draft, 9, March 2001. Schematically, the hierarchical organization of boxes in a JPEG2000 file is shown in FIG. 2. Boxes with dashed borders are optional in conforming JPEG2000 files. However, an optional box may define mandatory boxes within that optional box. In this case, if the optional box exists, the mandatory boxes within the optional box normally exist. FIG. 2 illustrates only the containment relationship between the boxes in the file. A particular order of those boxes in the file is not generally implied. Referring to FIGS. 3A-3D, a list of exemplary boxes that may be used in a JPEG2000 file are illustrated.

A JPEG2000 file may contain metadata boxes with intellectual property right information or vendor specific information. In this manner the JPEG200 file may be annotated with intellectual property rights information. In particular, the metadata will normally provide the ability to include copyright information, such as the proper copyright ownership of image files. This helps alleviate long held concerns regarding the unauthorized appropriation of image files without the copyright owners consent. In this manner, at least the copyright information will be provided together with the JPEG2000 file and the image described therein.

A JPEG2000 file may also include a UUID (universal unique identifier) box that contains vendor specific information. There may be multiple UUID boxes within the file. The UUID box is intended to provide additional vendor specific information for particularized applications, which would normally reflect information regarding the rendering or usage of the image contained within the file. However, the content to be provided within the UUID box is undefined.

DETAILED DESCRIPTION OF THE PREFERRED EMBODIMENT

What may be observed from the file format used for JPEG2000 is that nearly all the boxes contain data relevant to the rendering of the image itself, which is what would be expected from an image file format for a particular type of image, such as JPEG2000. Further, the image file format has been extended to include copyright information which is likewise of particular interest for the creator of the document. After consideration of the JPEG2000 file format and the constructs provided by the JPEG2000 file format, the present inventors came to the startling realization that the previously recognized uses of the JPEG2000 metadata box may be extended, while not extending or otherwise modifying the file format in a non-compliant manner, to include data that is representative of a description of the content depicted by the JPEG2000 file or to otherwise provide interactivity with the rendered image. The JPEG200 file format was intended to be a self-contained image description format for the rendering of an image and was not intended to support a description of the content of the image nor provide interactivity with the rendered image. Normally, if additional interactivity is desired for an image the file format is extended in a proprietary manner or otherwise an additional program is provided which provides such a description of the content, such as a database, and interactivity with the rendered image, such as animation and game software. Preferably, the content of the metadata box does not change the visual appearance of the image.

Figure 4:
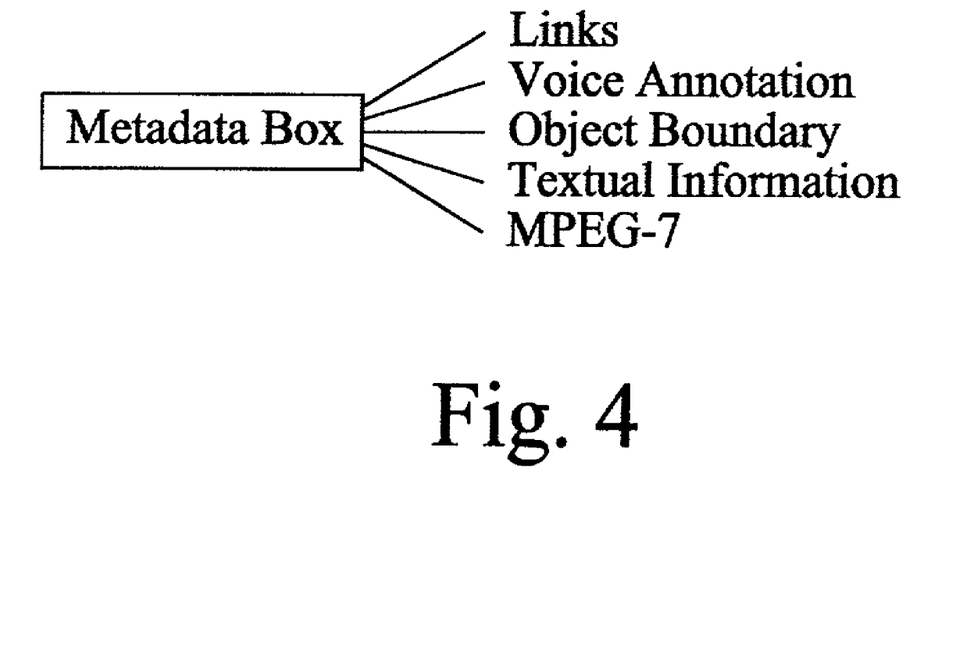
FIG. 4 illustrates a metadata box of a JPEG2000 file.

Referring to FIG. 4, for example the metadata box may contain information regarding links to additional information, voice annotations, textual information describing the content of the image, hot spots, and object boundary information regarding objects within the image itself. Further, the textual information may relate to, for example, the title, the category, keywords, date of creation, time of creation, etc. In this manner, the textual information describes the content of the image to be rendered by a suitable JPEG2000 viewer but is typically free from changing the rendered image. In addition, this information is provided within the constructs of the JPEG2000 file format in a compliant manner so that all compliant JPEG2000 viewers will be able to render the image in a proper manner and in addition process the additional information, if desired. It is to be understood that the metadata box is preferably in XML format, however, any format may be used, if desired.

Figure 5:
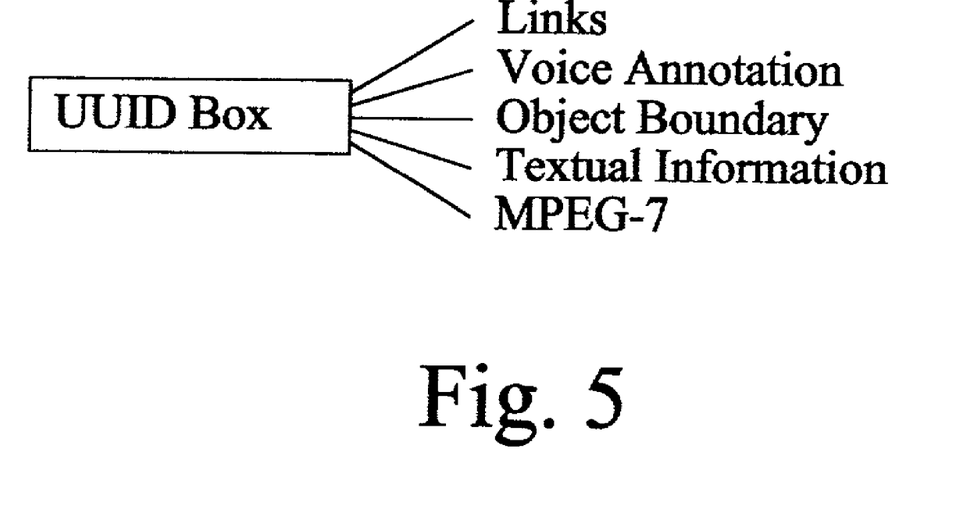
FIG. 5 illustrates a UUID box of a JPEG2000 file.

Referring to FIG. 5, after realizing the potential extension to the JPEG2000 file format the present inventors likewise determined that the UUID box may contain information regarding links to additional information, voice annotations, textual information describing the content of the image (e.g., actor, theme, genre, location, etc.), hot spots, and object boundary information regarding objects within the image itself. Further, the textual information may relate to, for example, the title, the category, keywords, date of creation, time of creation, etc. In this manner, the textual information describes the content of the image to be rendered by a suitable JPEG2000 viewer but is typically free from changing the rendered image. In addition, this information is provided within the constructs of the JPEG2000 file format in a compliant manner so that all compliant JPEG2000 viewers will be able to render the image in a proper manner and in addition process the additional information, if desired. It is to be understood that the UUID box is preferably in XML format, however, any format may be used, as desired.

MPEG-7 is a description scheme that, at least in part, provides a description of the content of video, such as actor, genre, etc. While MPEG-7 was specifically designed to relate to video content, the present inventors came to the realization that this video based scheme may be used for describing the content of an image file, namely JPEG2000 files, preferably in a compliant manner. Further, JPEG2000 specification does not define the syntax and semantics for the metadata that can be placed in the metadata and/or UUID boxes in the file format. Therefore, a need exists for the specification of the syntax and semantics for the contents of these boxes, preferably in a standardized syntax and semantics specification that will permit the exchangeability of the metadata contents contained in these boxes. Referring to FIGS. 4 and 5, the present inventors came to the further realization that at least a portion of the MPEG-7 description schemes describing video content may be suitable for use within the metadata boxes and/or UUID boxes of the JPEG2000 file format. This unlikely combination of file formats, namely JPEG2000 for image files and MPEG-7 describing video content, provides advantageous multi-standard interoperability. MPEG-7 is described in MPEG-7 Multimedia Description Schemes, Experimentation Model (XM) V 3.0, N3410, Geneva, May 2000; MPEG-7 Multimedia Description Schemes, Working Draft (WD) V. 3.0, N3411, Geneva, May 2000; MPEG-7 Description Definition Language (DDL) WD 3.0, N3391, Geneva, May 2000; MPEG-7 Visual Part of XM 6.0, N3398, Geneva, May 2000; MPEG-7 Visual Part, Working Draft (WD) V. 3.0, N3399, Geneva, May 2000; all of which is incorporated by reference herein.

While the combination of MEPG-7 and JPEG2000 is a desirable goal, the resulting file is preferably self-contained, in that all of the data necessary to render the image is contained within the file format. In the same manner, preferably the metadata or UUID information include the binary data necessary to execute or otherwise cause the desired activity to be carried out. In contrast to the execution of binary code, MPEG-7 was designed to provide a description of the content of the video media and accordingly lacked suitable constructs for embedding binary data with the information. After the determination of the need for embedding binary data within an MPEG-7 description scheme, especially suitable for providing metadata or UUID data within a JPEG2000 file format, the present inventors modified the previously existing MPEG-7 standard to include a suitable technique for including binary data, which was not previously considered to have any value.

A new description scheme was been developed, namely, "InlineMedia" that permits the identification of the format of the media stream, such as for example, indicated by a MediaFormat Description Scheme or a FileFormat (MIME-type) identifier. The audio and/or visual material contained in an InlineMedia description may be either essence data or audio and/or visual data representing other essence data, depending on its context. The InlineMedia enables the description of audio and/or visual data located within the description itself, without having to refer to a location external to the description.

The InlineMedia syntax may be as follows:

```
<!--  ######################################## -->
<!--  Definition of InlineMedia Datatype       -->
<!--  ######################################## -->
<complexType name="InlineMediaType">
    <choice>
        <element name="MediaData16">
            <simpeType>
                <restriction base="binary">
                    <encoding value="hex">
                </restriction>
            </simpleType>
        </element>
        <element name="MediaData64">
            <simpleType>
                <restriction base="binary">
                    <encoding value="base64"/>
                </restriction>
            </simpleType>
        </element>
    </choice>
    <attribute name="type" type="mpeg7:mimeType" use="required"/>
</complexType>
```

It is noted that <!-- is the start of a comment while --> is the end of a comment. Likewise choice provides a set of options, with the first option being binary data encoded in base 16 and the second option being binary data encoded in base 64. Other bases may likewise be used, as desired. The attribute name indicates the data type, such as MPEG data and their format, and whether this attribute is included in the description.

Summary of InlineMediaType

InlineMediaType A descriptor for specifying media data embedded in the description.

MediaData16 Specifies binary media data encoded as a textual string in base-16 format.

MediaData64 Specifies binary media data encoded as a textual string in base-64 format.

Type Specifies the MIME type of media data.

| InlineMedia Example |
|---|
| `<myInlineMedia type="image/jpeg">`<br>    `<MediaData16>98A34F10C5094538AB93873262522DA3</MediaData16>`<br>`</myInlineMedia>` |

The binary code embedded within the InlineMedia may be, for example, executable code, audio segments, video segments, and still images.

The InlineMedia descriptor is preferably included within the MediaLocation specification in MPEG-7, by modification of the MediaLocator specification.

```
The MediaFormat syntax may be as follows:
<!-- ######################################## -->
<!-- Definition the Media Format DS            -->
<!-- ######################################## -->
<complexType name="MediaFormat">
    <element name="FileFormat" type="mds:ControlledTerm"/>
    <element name="System" type="mds:ControlledTerm"
        minOccurs="0"/>
    <element name="Medium" type="mds:ControlledTerm"
        minOccurs="0"/>
    <element name="Color" type="mds:ControlledTerm"
        minOccurs="0"/>
    <element name="Sound" type="mds:ControlledTerm"
        minOccurs="0"/>
    <element name="FileSize" type="nonNegativeInteger"
        minOccurs="0"/>
    <element name="Length" type="mds:TimePoint" minOccurs="0"/>
    <element name="AudioChannels" type="nonNegativeInteger"
        minOccurs="0"/>
    <element name="AudioLanguage" type="language"
        minOccurs="0"/>
    <element name="id" type="ID"/>
</complexType>
```

Summary of MediaFormat

| | |
|---|---|
| MediaFormat | Description of the storage format of the media. |
| id | Identification of the instance of the media format description. |
| FileFormat | The file format or MIME type of the audio and/or video content instance. |
| System | The video system of the audio and/or video content (e.g., PAL, NTSC). |
| Medium | The video system of the audio and/or video content is sotred (e.g., tape, CD, DVD). |
| Color | The color domain of the audio and/or video content (e.g., color, black/white, colored). |
| Sound | The sound domain of the audio and/or video content (e.g., no sound, stereo, mono, dual, surround, 5.1, dolby digital). |
| FileSize | The size, in byte for example, of the file where the audio and/or video content is stored. |
| Length | The duration of the audio and/or video content. |
| AudioChannels | The number of audio channels in the audio and/or video content. |
| AudioLanguage | The language used in the audio of the audio and/or video content. |

Also, the previously existing MediaLocator of MPEG-7 is extended by adding the InlineMedia as follows:

```
<complexType name = "MediaLocator">
    <choice>
        <sequence>
            <element name = MediaURL" type = "mds:
                MediaURL"/>
            <element name = "MediaTime type = "mds:MediaTime"
                minOccurs = "0"/>
        </sequence>
        <element name = "MediaTime" type = "mds:MediaTime"/>
        <element name = "InlineMedia" type = mds:InlineMedia"/>
    </choice>
</complexType>
                        MediaLocator Example
<MediaLocator>
    <InlineMedia>
        <FileFormat>mp3</FileFormat>
        <MediaData>98A34F12348942323423AB2342</MediaData>
    </InlineMedia>
<MediaLocator>
```

An alternative implementation assumes that the media data can be placed at an arbitrary location in the JPEG2000 files. In this case a byte offset may be used to locate the binary data. In this case, the MediaLocator is alternatively modified as follows:

```
<complexType name = "MediaLocator">
    <choice>
        <sequence>
            <element name = MediaURL" type = "mds:MediaURL"/>
            <element name = "MediaTime type = "mds:MediaTime"
                minOccurs = "0"/>
        </sequence>
        <sequence>
            <element name = "MediaURL" type = "mds:MediaURL"/>
            <element name = "ByteOffset" type = "nonNegativeInteger"
                minOccurs = "0"/>
        </sequence>
        <element name = "MediaTime" type = "mds:MediaTime"/>
    </choice>
</complexType>
```

In this embodiment of MediaLocator, the MediaURL points to the JPEG2000 file itself. The format of the media is specified by the MediaFormat. The ByteOffset may be an absolute offset within the file, a relative offset, or otherwise indicating a location within the file.

Another embodiment of the present invention includes another class of applications, namely, a bounding region of a portion of the image and associating metadata and information with this bounding region(s). The information is typically related to the objects (or image regions) that are defined by the bounding region. The metadata box and/or the UUID box in the JPEG200 file format may be utilized to store descriptors and data that define and identify the bounding regions as well as data associated with the regions, such as object specific URL links, voice annotation, and textual annotation. One of many applications of such data is user interaction with images where the users interactively discover and consume information that relate to the content of the image.

While any suitable syntax may be used to define the bounding region, the bounding region is preferably expressed in XML. Further, the XML is preferably expressed in the form defined by MPEG-7 so that the JPEG2000 file and the MPEG-7 portion are compliant with the respective standards.

Within the MPEG-7 standard the bounding region may be achieved by using the Still Region Description Scheme. The Still Region Description Scheme is derived from the Segment Description Scheme. The Segment Description Scheme is used to specify the structure of spatial and temporal segments of visual data such as images and video in general. Segments can be decomposed into other segments. The Still Region Description Scheme is used to specify a spatial type of segment in still images or a single video frames.

The Segment Description Scheme and the Still Region Description Scheme may be as follows:

```
<!-- ######################################## -->
<!-- Definition of "Segment DS"               -->
<!-- ######################################## -->
<!-- Definition of datatype of the decomposition -->
<simpleType name="DecompositionDataType" base="string">
    <enumeration value="spatial"/>
    <enumeration value="temporal"/>
    <enumeration value="spatio-temporal"/>
    <enumeration value="MediaSource"/>
</simpleType>
<!-- Definition of the decomposition -->
<complexType name="SegmentDecomposition">
    <element ref="Segment" minOccurs="1" maxOccurs="unbounded"/>
    <attribute name="DecompositionType"
    type="mds:DecompositionDataType" use="required"/>
    <attribute name="Overlap" type="boolean" use="default"
    value="false"/>
    <attribute name="Gap" type="boolean" use="default"
    value="false"/>
</complexType>
<element name="Segment" type="mds:Segment"/>
<!-- Definition of the Segment itself -->
<complexType name="Segment" abstract="true">
    <element name="MediaInformation" type="mds:MediaInformation"
    minOccurs="0" maxOccurs="1"/>
    <element name="CreationMetaInformation"
    type="mds:CreationMetaInformation"
    minOccurs="0" maxOccurs="1"/>
    <element name="UsageMetaInformation"
    type="mds:UsageMetaInformation" minOccurs="0"
    maxOccurs="1"/>
    <element name="StructuredAnnotation"
    type="mds:StructuredAnnotation" minOccurs="0"
    maxOccurs="unbounded"/>
    <element name="MatchingHint" type="mds:MatchingHint"
    minOccurs="0"
    maxOccurs="unbounded"/>
    <element name="PointOfView" type="mds:PointOfView"
    minOccurs="0" maxOccurs="unbounded"/>
    <element name="SegmentDecomposition"
    type="mds:SegmentDecomposition" minOccurs="0"
    maxOccurs="unbounded"/>
    <attribute name="id" type="ID" use="required"/>
    <attribute name="href" type="uriReference" use="optimal"/>
    <attribute name="idref" type="IDREF" refType="Segment"
    use="optional"/>
</complexType>
```

Summary of SegmentDecomposition

SegmentDecomposition
  Decomposition of a segment into one or more segments.
DecompositionDataType
  Datatype defining the kind of segment decomposition. The possible kinds of segment decomposition are spatial, temporal, spatio-temporal, and media source. The bounding regions may be, for example, spatial segments.
DecompositionType
  Attribute, which specifies the decomposition type of a segment.
Overlap Boolean, which specifies if the segments resulting from a segment decomposition overlap in time or space. The bounding regions in the image may overlap.
Gap Boolean, which specifies if the segments resulting from a segment decomposition leave gaps in time or space.
Segment Set of segments that form the composition.

Summary of Segment

Segment Abstract structure which represents a fragment or section of the audio and/or video content. For example, a segment may be a region in an image or a moving region in a video sequence. A segment can be decomposed into other segments through the SegmentDecomposition. This may be used to specify the object's shape, if needed, within a bounding region, where the outline of the object is specified in terms of a decomposition of the bounding region.
id Identifier of a video segment. This may be used to uniquely identify multiple bounding regions, spatial segments, in an image.
DecompositionDataType
  Datatype defining the kind of segment decomposition. The possible kinds of segment decomposition are spatial, temporal, spatio-temporal, and media source.
MediaInformation
  Media information relates to the segment and its descendants.
CreationMetaInformation
  Creation Meta Information relates to the segment and its descendants. This may be used to associate data with segments, such as URL, audio files, etc.
UsageMetaInformation
  Usage Meta Information relates to the segment and its descendants.
SegmentDecomposition
  Decomposition of the segment into sub-segments.
Annotation Textual annotation and description of people, animals, objects, actions, places, time, and/or purpose which are instantiated in the segment. This may be used to associate textual annotations with the bounding regions.

```
<!-- ######################################## -->
<!-- Definition of "StillRegion DS"           -->
<!-- ######################################## -->
<element name="StillRegion" type="mds:StillRegion"
equivClass="Segment"/>
<complexType name=StillRegion" base="mds:Segment"
derivedBy="extension">
    <element ref="ColorSpace" minOccurs="0" maxOccurs="1"/>
    <element ref="ColorQuantization" minOccurs="0" maxOccurs="1"/>
```

-continued

```
<element ref="DominantColor" minOccurs="0" maxOccurs="1"/>
<element ref="ColorHistogram" minOccurs="0" maxOccurs="1"/>
<element ref="BoundingBox" minOccurs="0" maxOccurs="1"/>
<element ref="RegionShape" minOccurs="0" maxOccurs="1"/>
<element ref="ContourShape" minOccurs="0" maxOccurs="1"/>
<element ref="ColorStructureHistogram" minOccurs="0"
    maxOccurs="1"/>
<element ref="ColorLayout" minOccurs="0" maxOccurs="1"/>
<element ref="CompactColor" minOccurs="0" maxOccurs="1"/>
<element ref="HomogeneousTexture" minOccurs="0"
    maxOccurs="1"/>
<element ref="TextureBrowsing" minOccurs="0" maxOccurs="1"/>
<element ref="EdgeHistogram" minOccurs="0" maxOccurs="1"/>
<element ref="SpatialConnectivity" type="boolean"
    use="required"/>
<!-- Restriction of refType to StillRegion DS -->
<attribute name="idref" type="IDREF" refType="StillRegion"
    use="optional"/>
</complexType>
```

StillRegion Summary

StillRegion Set of pixels from an image or a frame in a video sequence. It is noted that no motion information should be used to describe a still region. Still image can be natural image or synthetic images. A still image is a particular case of a still region. The pixels do not need to be connected (see the SpatialConnectivity attribute).

SpatialConnectivity Boolean which specifies if a still region is connected in space, i.e. connected pixels.

ColorSpace Description of the color space used for the color of the still region.

ColorQuantization Description of the color quantization used for the color of the still region.

DominantColor Description of the dominant color of the still region.

Color Histogram Description of the color histogram of the region. This may be used to embed a low-level color description to bounding regions, when desired.

BoundingBox Description of a bounding region containing the region. This is used to describe the bounding region as a region, such as a rectangular region.

Using the aforementioned specification the bounding region in a JPEG2000 image may be described as spatial segments and the descriptor BoundingBox may be used to define the locations and dimensions of bounding region(s), and each region is identified by an id, which is preferably unique.

Embedding of textual information, such as annotations, may be implemented by the structured annotation description scheme. Each segment can reference the structured annotation description scheme individually and at multiplicities identified by their corresponding identifiers. The StructuredAnnotation Description Scheme may be as follows:

```
<!-- ######################################## -->
<!-- Definition of StructuredAnnotation DS    -->
<!-- ######################################## -->
<element name="TextAnnotation"
    type="mds:TextualDescription"/>
<element name="structuredAnnotation"
    type="mds:StructuredAnnotation"/>
<complexType name="StructuredAnnotation"
    type="mds:StructuredAnnotation"/>
<complexType name="StructuredAnnotation">
    <element name="Who" type="mds:ControlledTerm"
        minOccurs="0"/>
    <element name="WhatObject" type="mds:ControlledTerm"
        minOccurs="0"/>
    <element name="WhatAction" type="mds:ControlledTerm"
        minOccurs="0"/>
    <element name="Where" type="mds:ControlledTerm"
        minOccurs="0"/>
    <element name="When" type="mds:ControlledTerm"
        minOccurs="0"/>
    <element name="Why" type="mds:ControlledTerm"
        minOccurs="0"/>
    <element name="TextAnnotation" type="mds:TextualDescription"
        minOccurs="0"/>
    <attribute name="id" type='ID'/>
    <attribute ref="xml:lang"/>
</complexType>
```

StructuredAnnotation Summary

TextAnnotation Free textual annotation.

StructuredAnnotation Textual free annotation and description of people, animals, objects, actions, places, time, and/or purpose.

Who Textual description of people and animals. May be from a thesaurus or a contolled vocabulary.

WhatObject Textual description of objects. May be from a thesaurus or a contolled vocabulary.

WhatAction Textual description of actions. May be from a thesaurus or a contolled vocabulary.

Where Textual description of places. May be from a thesaurus or a contolled vocabulary.

When Textual description of time. May be from a thesaurus or a contolled vocabulary.

Why Textual description of purpose May be from a thesaurus or a contolled vocabulary.

Annotation Textual free annotation and description of people, animals, objects, actions, places, time, and/or purpose.

id Identifier for an instantiation of the StructuredAnnotation Description Scheme.

Embedding of universal resource locators (URL's) (identifier for information outside of the JPEG2000 file) for each bounding region may be realized using the RelatedMaterial description. The RelatedMaterial description scheme is referenced by the CreationMetaInformation DS. Each segment (e.g., each boudnging region) references CreationMetaInformation DS, multiple times, if desired. The RelatedMaterial DS may be specified as follows:

```
<!-- ######################################## -->
<!-- Definition the RelatedMaterial DS        -->
<!-- ######################################## -->
<DSType name="RelatedMaterial">
    <attribute name="id" datatype="ID"/>
    <attribute name="Master" datatype="boolean" default="true"
        required="false"/>
    <DTypeRef name="MediaType" type="controlledTerm"/>
    <DSTypeRef type="MediaLocator" minOccurs="0"/>
    <DSTypeRef type="MediaInformation" minOccurs="0"/>
    <DSTypeRef type="CreationMetaInformation" minOccurs="0"/>
    <DSTypeRef type="UsageMetaInformation" minOccurs="0"/>
</DSType>
```

RelatedMaterial Summary

RelatedMaterial Description of materials containing additional information about the audio and/or video content.

Master Boolean attribute that allows to identify if the referenced related material is the master.

MediaType The media type of the referenced related material (e.g., web page, audiovisual media, a printed book).

MediaLocator The locator of the referenced related material.

MediaInformation The media information description of the referenced related material.

CreationMetaInformation
    The creation meta information description of the referenced related material.

UsageMetaInformation
    The usage meta information description of the referenced related material.

In another embodiment the media data may be included in the UUID box in the JPEG2000 file. In this embodiment the MPEG-7 description schemes are suitable for use in their previously existing format. Typically the UUID box is implicitly referenced from the metadata box via the MediaFormat Description Scheme. The MediaProfile DS and the MediaInformation DS may be as follows:

```
<!-- ######################################## -->
<!-- Definition the MediaProfile DS           -->
<!-- ######################################## -->
<DSType name="MediaProfile">
    <attribute name="id" datatype="ID"/>
    <DSTypeRef type="MediaInformation"/>
    <DSTypeRef type="MediaFormat"/>
    <DSTypeRef type="MediaCoding" minOccurs="0"
    maxOccurs="*"/>
    <DSTypeRef type="MediaInstance" minOccurs="0"
    maxOccurs="*"/>
</DSType>
```

Summary of MediaProfile

MediaProfile DS describing one profile of the media being described.

id Identification of the instance of the MediaProfile description.

MediaIdentification Identification of the master media profile.

MediaFormat Description of the storage format of the master media profile.

MediaCoding Description of the coding parameters of the master media profile.

MediaInstance Description and the localization of the master media profile.

```
<!-- ######################################## -->
<!-- Definition the MediaInformation DS       -->
<!-- ######################################## -->
<DSType name="MediaInformation">
    <attribute name="id" datatype="ID"/>
    <DSTypeRef type="MediaProfile" maxOccurs="*"/>
</DSType>
```

Summary of MediaInformation

MediaInformation The MediaInformation DS contains one or more MediaProfileDSs. Each MediaInformation DS is related to one reality. For example, a concert may have been recorded in audio and in audio-visual media. Afterwards each media may be available in different format, e.g., the audio media in CD, and the audio-visual media in MPEG-1, MPEG-2, and MPEG-4. This will imply four MediaProfiles for the same reality.

id Identification of the instance of the MediaProfile description.

MediaProfile Ds describing one profile of the essence being described.

In this embodiment, when the MediaLocator within the Related Media description points at the JPEG2000 file itself via MediaURL, the client application implicitly knows that the related media is contained in a UUID box within this same file containing the XML box. The UUID is referenced through Media Format description. The application will then locate the UUID box with the matching ID in the file and read its contents. The format of the audio media (e.g., mp3) that is contained in the UUID ox may be specified a priori by the owner of the UUID format. The mechanism for referring to the JPEG2000 file itself and the UUID from the XML box is summarized below, suching the existing MPEG-7 description schemes and their hierarchical structure:

. . .

RelatedMaterial
    MediaType
        Audio
    MediaLocator
        URL:JPEG2000 file
    MediaInformation
        MediaProfile
            MediaFormat
            UUID

. . .

The XML box is equipped by a mechanism to refer to the UUID box that contains the data, as described above. A format needs to be specified for the UUID box in order to organize the data within and associate the data with different regions and different media types. This format is typically vendor specific and identified by the UUID.

The following format for the UUID box is one potential example. It assumes that all the embedded data is stored in one single UUID box, provided that the data are within the same file. Data associated with different regions are identified according to their corresponding region ID. Types of data are also specified. The Region Data Length is included to minimize parsing during navigation amongst different regions as the user interacts with the image. The media Data Length is included to enable rapid navigation of data embedded within the same region.

UUID Box Format Comment

ID The ID of the particular UUID box is specified by the MediaInformation/MediaFormat description referenced in the RelatedMaterial description in the XML box.

Region ID Matches the ID of the Still Region described by the StillRegion description in the XML box.

Region Data Length Total length of data associated with this region.

Media Type Media Type corresponds to the valu of the Media Type descriptor in RelatedMaterial description in the XML box (it may be mapped to a binary code in the UUID box)

Media Data Length

Media Data

. . .

Media Type

Media Data Length

Media Data

. . .

Region ID

Region Data Length

Media Type

Media Data Length

Media Data

. . .

It may be noted that the Region ID in the above table may be generalized to an "Object ID". The Object ID may then refer to any XML object, i.e., any description that is identified by an ID. In that case, a Person Description may have an audio annotation associated with it, or a Summary Description may have executable software associated with it. MPEG-7 does support identification of XML descriptions using unique identifiers.

Summary of MPEG-7 Tools Used in the UUID Box of JPEG200

| Summary of MPEG-7 tools used in the UUID box of JPEG200 | | |
|---|---|---|
| Embedded Information | MPEG-7 Tool | JPEG2000 File Format Structure |
| Bounding Region(s) | Still Region DS | XML Box |
| Textual Annotation | Annotation DS | XML Box |
| URL Link | Related Material DS | XML Box |
| Audio/Voice Annotation Data | Related Material DS | XML Box: indicates Media Type as "Audio" and contains reference to the UUID Box; contains the audio data. |
| Executable Code | Related Material DS | XML Box: indicates Media Type as "executable" and contains reference to the ID of the UUID box containing the executable; UUID Box: contains the executable code. |

In a multi-level implementation of the system, a server may first provide the client the image data, the bounding regions, and the type and format of the data associated with the bounding regions. The data that is of further interest to the user may then be delivered upon user's request.

If desired, MPEG-7 compliant data/information may be considered the MPEG-7 specification as it exists (or substantially similar) to the date of filing of this application.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A digital file stored on a computer-readable medium, said digital file comprising:
    (a) a plurality of boxes containing data arranged in a manner consistent with the JPEG2000 specification and suitable to render an image when read by a computer;
    (b) at least one of said boxes being a metadata box; and
    (c) including information within said metadata box describing the content of said image, wherein said information provides user-interactivity with the rendered image; where
    (d) said digital file is stored on said computer-readable medium using a single self-contained file and includes computer-executable instructions for enacting said interactivity.

2. The digital file of claim 1 wherein said information is in XML format.

3. The digital file of claim 1 wherein said digital file is compliant with the JPEG2000 standard.

4. The digital file of claim 1 wherein said information defines a boundary around a portion of said image that a user may interact with.

5. The digital file of claim 4 wherein said boundary is rectangular.

6. The digital file of claim 4 wherein additional information regarding the semantics of said content is associated with said portion of said image.

7. The digital file of claim 1 wherein said information includes links to information to said digital file.

8. The digital file of claim 1 wherein said information includes voice annotation.

9. The digital file of claim 1 wherein said information includes object boundary information.

10. The digital file of claim 1 wherein said information includes textual information regarding the content of said image free from copyright information.

11. The digital file of claim 1 wherein said information is MPEG-7 data.

12. The digital file of claim 11 wherein said MPEG-7 data is compliant with the MPEG-7 specification.

13. The digital file of claim 11 wherein said information includes binary data.

14. A digital file stored on a computer-readable medium, said digital file comprising:
    (a) a plurality of boxes containing data arranged in a manner consistent with the JPEG2000 specification and suitable to render an image when read by a computer;
    (b) at least one of said boxes being a UUID box; and
    (c) including information within said UUID box describing the content of said image, wherein said information provides user-interactivity with the rendered image; where
    (d) said digital file is stored on said computer-readable medium using a single self-contained file and includes computer-executable instructions for enacting said interactivity.

15. The digital file of claim 14 wherein said information is in XML format.

16. The digital file of claim 14 wherein said digital file is compliant with the JPEG2000 standard.

17. The digital file of claim 14 wherein said information defines a boundary around a portion of said image that a user may interact with.

18. The digital file of claim 17 wherein said boundary is rectangular.

19. The digital file of claim 17 wherein additional information regarding semantics of said content is associated with said portion of said image.

20. The digital file of claim 14 wherein said information includes links to information external to said digital file.

21. The digital file of claim 14 wherein said information includes voice annotation.

22. The digital file of claim 14 wherein said information includes object boundary information.

23. The digital file of claim 14 wherein said information includes textual information regarding the content of said image free from copyright information.

24. The digital file of claim 14 wherein said information is MPEG-7 data.

25. The digital file of claim 24 wherein said MPEG-7 data is compliant with the MPEG-7 specification.

26. The digital file of claim 24 wherein said information includes binary data.

27. A digital file stored on a computer-readable medium, said digital file comprising:
   (a) a plurality of boxes containing data arranged in a manner consistent with the JPEG2000 specification and suitable to render an image when read by a computer; and
   (b) at least one of said boxes containing information that provides user-interactivity with the rendered image, said user-interactivity comprising at least one of:
      (i) defining a bounded portion of said image that said user may interact with; and
      (ii) providing voice annotation associated with a user-selectable region of said image; where
   (c) said digital file is stored on said computer-readable medium using a single self-contained file and includes computer-executable instructions for enacting said interactivity.

28. The digital file of claim 27 further including information within at least one of a metadata box and a UUID box describing the content of said image wherein said information is in XML format.

29. The digital file of claim 28 wherein said information includes links to information external to said digital file.

30. The digital file of claim 28 wherein said information includes voice annotation.

31. The digital file of claim 28 wherein said information includes object boundary information.

32. The digital file of claim 28 wherein said information includes textual information regarding the content of said image free from copyright information.

33. The digital file of claim 27 wherein said digital file includes a metadata box.

34. The digital file of claim 27 wherein said bounded portion is rectangular.

35. The digital file of claim 27 wherein additional information regarding said content is associated with said bounded portion bounding region of said image.

36. The digital file of claim 32 wherein said MPEG-7 compliant description scheme includes binary data.

37. A digital file stored on a computer-readable medium, said digital file comprising
   (a) a plurality of boxes containing data arranged in a manner consistent with the JPEG2000 specification and suitable to render an image when read by a computer;
   (b) at least one of said boxes being a UUID box; and
   (c) including information within said UUID box indicating the location of binary data, within said file and not within said UUID box, associated with said image,
      wherein said binary data provides user-interactivity with said image, said user-interactivity comprising at least one of:
         (i) defining a bounded a portion of said image that said user may interact with; and
         (ii) providing voice annotation associated with a user-selectable region of said image; where
   (d) said digital file is stored on said computer-readable medium using a single self-contained file and includes computer-executable instructions for enacting said interactivity.

38. The digital file of claim 37 wherein said information is in XML format.

39. The digital file of claim 37 wherein said digital file is compliant with the JPEG2000 standard.

40. The digital file of claim 37 wherein said bounded portion is rectangular.

41. The digital file of claim 37 wherein additional information regarding said image is associated with said bounded portion of said image.

42. The digital file of claim 37 wherein said information includes links to information external to said digital file.

43. The digital file of claim 37 wherein said binary data includes voice annotation.

44. The digital file of claim 37 wherein said binary data includes object boundary information.

45. The digital file of claim 37 wherein said information includes textual information regarding the content of said image free from copyright information.

46. The digital file of claim 37 wherein said information is MPEG-7 data.

47. The digital file of claim 46 wherein said MPEG-7 data is compliant with the MPEG-7 specification.

48. A digital file stored on a computer-readable medium, said digital file comprising:
   (a) a plurality of boxes containing data arranged in a manner consistent with the JPEG2000 specification and suitable to render an image when read by a computer; and
   (b) at least one of said boxes containing an audio file, where said digital file is stored on said computer-readable medium using a single self-contained file and includes computer-executable instructions for playing said audio file.

* * * * *

UNITED STATES PATENT AND TRADEMARK OFFICE
CERTIFICATE OF CORRECTION

| | | |
|---|---|---|
| PATENT NO. | : 7,647,340 B2 | Page 1 of 1 |
| APPLICATION NO. | : 09/882416 | |
| DATED | : January 12, 2010 | |
| INVENTOR(S) | : Petrus Van Beek | |

It is certified that error appears in the above-identified patent and that said Letters Patent is hereby corrected as shown below:

Col. 4, Line 35

Change "<simpeType>" to read --<simpleType>--.

Col. 15, Line 2

Change "regarding semantics" to read --regarding the semantics--.

Col. 15, Line 55

Change "said bounded portion bounding region of said image" to read --said bounded portion of said image--.

Col. 16, Line 15

Change "a bounded a portion" to read --a bounded portion--.

Signed and Sealed this

Thirty-first Day of August, 2010

David J. Kappos
*Director of the United States Patent and Trademark Office*